(12) United States Patent
Eger et al.

(10) Patent No.: US 11,193,461 B2
(45) Date of Patent: Dec. 7, 2021

(54) CHARGE AIR LINE OF AN INTERNAL COMBUSTION ENGINE AND INTERNAL COMBUSTION ENGINE

(71) Applicant: MAN Energy Solutions SE, Augsburg (DE)

(72) Inventors: Thomas Eger, Augsburg (DE); Bernd Knauer, Münster (DE); Thomas Körting, Rehling (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/859,776

(22) Filed: Apr. 27, 2020

(65) Prior Publication Data

US 2020/0347807 A1    Nov. 5, 2020

(30) Foreign Application Priority Data

May 3, 2019 (DE) ..................... 10 2019 111 421.7

(51) Int. Cl.
*F02B 27/02* (2006.01)
*F02M 35/112* (2006.01)

(52) U.S. Cl.
CPC ............ *F02M 35/112* (2013.01); *F02B 27/02* (2013.01)

(58) Field of Classification Search
CPC .......... F02B 27/02; F02B 75/22; F02M 35/112
See application file for complete search history.

(56) References Cited

U.S. PATENT DOCUMENTS

| | | | | |
|---|---|---|---|---|
| 4,854,271 A | * | 8/1989 | Miyano | F02B 27/0263 123/184.31 |
| 5,027,753 A | * | 7/1991 | Hamazaki | F02B 27/021 123/184.31 |
| 6,058,707 A | * | 5/2000 | Bischoff | F02D 41/0007 60/602 |

* cited by examiner

*Primary Examiner* — Gonzalo Laguarda
(74) *Attorney, Agent, or Firm* — Cozen O'Connor

(57) ABSTRACT

A charge air line of an internal combustion engine for supplying multiple cylinders of a cylinder bank of the internal combustion engine arranged in-line with charge air, has multiple charge air line sections. Emanating from each charge air line section a branch leads to a cylinder, the branch screwable to a cylinder head of the respective cylinder. The charge air line has an upstream end, via which charge air is feedable to the charge air line, and a downstream end, which is closed by an end cap. At the downstream end, the charge air line has a larger flow cross section than at the downstream end.

10 Claims, 1 Drawing Sheet

CHARGE AIR LINE OF AN INTERNAL COMBUSTION ENGINE AND INTERNAL COMBUSTION ENGINE

BACKGROUND OF THE INVENTION

1. Field of the Invention

The invention relates to a charge air line of an internal combustion engine and to an internal combustion engine.

2. Description of the Related Art

An internal combustion engine, such as for example an internal combustion engine of a ship, comprises multiple cylinders. The cylinders are typically grouped forming at least one cylinder bank. In the region of each cylinder bank, multiple cylinders are positioned in-line one behind the other or next to one another. An internal combustion engine in a V-design comprises two cylinder banks each with multiple cylinders. In the case of a V20 internal combustion engine, each cylinder bank comprises a total of ten cylinder which are positioned in-line.

In each cylinder of an internal combustion engine fuel is combusted. Charge air required for this purpose can be fed to the respective cylinder via inlet-side gas exchange valves. By way of exhaust-side gas exchange valves, exhaust gas generated during the combustion of the fuel can be discharged from the respective cylinder.

The inlet-side gas exchange valves of the cylinders of a cylinder bank of an internal combustion engine are suppliable with charge air via a charge air line. There, a charge air line extends over the region of the respective cylinder bank that comprises multiple charge air line sections. Emanating from each charge air line section, a branch branches off the charge air line via which charge air can be fed to a cylinder head of the respective cylinder. The respective charge air line section is screwed to the respective cylinder head of the respective cylinder.

Charge air lines known from practice have an upstream end and a downstream end. Charge air can be fed to the charge air line in the region of the upstream end. At the downstream end, the charge air line is closed by an end cap. Charge air lines known from practice have a constant flow cross section between the upstream end and the downstream end.

Because the charge air line at the downstream end is closed by an end cap, a force acts on the end cap, which, on the one hand, depends on the flow cross section of the charge air line in the region of the downstream end on the end cap and on the pressure within the charge air line. This force acting on the end cap causes a transverse force that has to be absorbed by the screw connection of the branch of the seen in flow direction last or downstream charge air line section with the cylinder head. The screw connection of the seen in the flow direction of the charge air last charge air line section, namely the branch of the same, with the cylinder head of the corresponding cylinder, is accordingly configured for absorbing this transverse force. By using same parts, corresponding screw connections are also employed on the branches of upstream air line sections positioned upstream, which are then overdimensioned since on these upstream charge air line sections or branches according to practice no such transverse force has to be absorbed by the screw connections. This overdimensioning is disadvantageous since it causes increased weight and increased costs.

There is a need for securely absorbing forces that occur in the region of a charge air line, however to dimension the screw connections utilized on the branches branching off the charge air line sections of the charge air line smaller and lighter.

SUMMARY OF THE INVENTION

Starting out from this, it is an object of the invention to create a new type of charge air line of an internal combustion engine and a corresponding internal combustion engine. This object may be solved through a charge air line having a larger flow cross section at the upstream end than at the downstream end. Because of the fact that with the charge air line according to an aspect of the invention a larger flow cross section is provided at the upstream end than at the downstream end, the transverse force that occurs at the downstream end in the region of the end cap is reduced. The screw connections, via which the branches of the charge air line sections are screwed to the cylinder heads of the cylinders, can thus be dimensioned lighter.

According to an advantageous further development, the charge air line has a number of N charge air line sections, to supply a number of N cylinders of the respective cylinder bank with charge air. The charge air line in the region of the upstream end and emanating, seen from the upstream end, in the region of the 1-st to J-th charge air line section has a first flow cross section, wherein J<N. The charge air line emanating, seen from the upstream end, has a second flow cross section at least in the region of the N-th charge air line section and of the downstream end, which is smaller than the first flow cross section. Preferentially, J=N−2 or J=N−1. This embodiment of the charge air line is particularly preferred in order to embody screw connections, which serve for screw-connecting the branches branching off the charge air line sections to the cylinder heads of the cylinders smaller and lighter. A transverse force, which in the past according to practice had to be absorbed exclusively in the region of the seen in the flow direction of the charge air N-th and thus last charge air line section of the charge air, are distributed over multiple charge air line sections according to the invention. As already explained, it is thereby possible to embody screw connections, which serve for connecting branches off branching off the charge air line sections to the cylinder head of the respective cylinder, smaller and lighter.

According to an advantageous further development, the flow cross section in the region of the J-th charge air line section decreases from the first flow cross section to the second flow cross section. The flow cross section decreases from the first flow cross section to the second flow cross section continuously, in particular in the manner of a funnel or conically.

According to an advantageous further development, the ratio V=A2/A1 between the second flow cross section A2 and the first flow cross section A1 $0.3 \leq V \leq 0.7$ applies, preferably $0.4 \leq V \leq 0.5$ applies, particularly preferably V=0.5 applies. In particular when the flow cross section in the region of a charge air line section, emanating from the first cross section to the second flow cross section is reduced, it is particularly advantageous when the ratio is V 0.5 or approximately 0.5, so that the transverse force is then evenly or approximately evenly distributed over two charge air line sections.

BRIEF DESCRIPTION OF THE DRAWINGS

Preferred further developments of the invention are obtained from the following description. Exemplary embodiments of the invention are explained in more detail by way of the drawings without being restricted to this. In the drawings.

DETAILED DESCRIPTION OF THE PRESENTLY PREFERRED EMBODIMENTS

Figure 1:
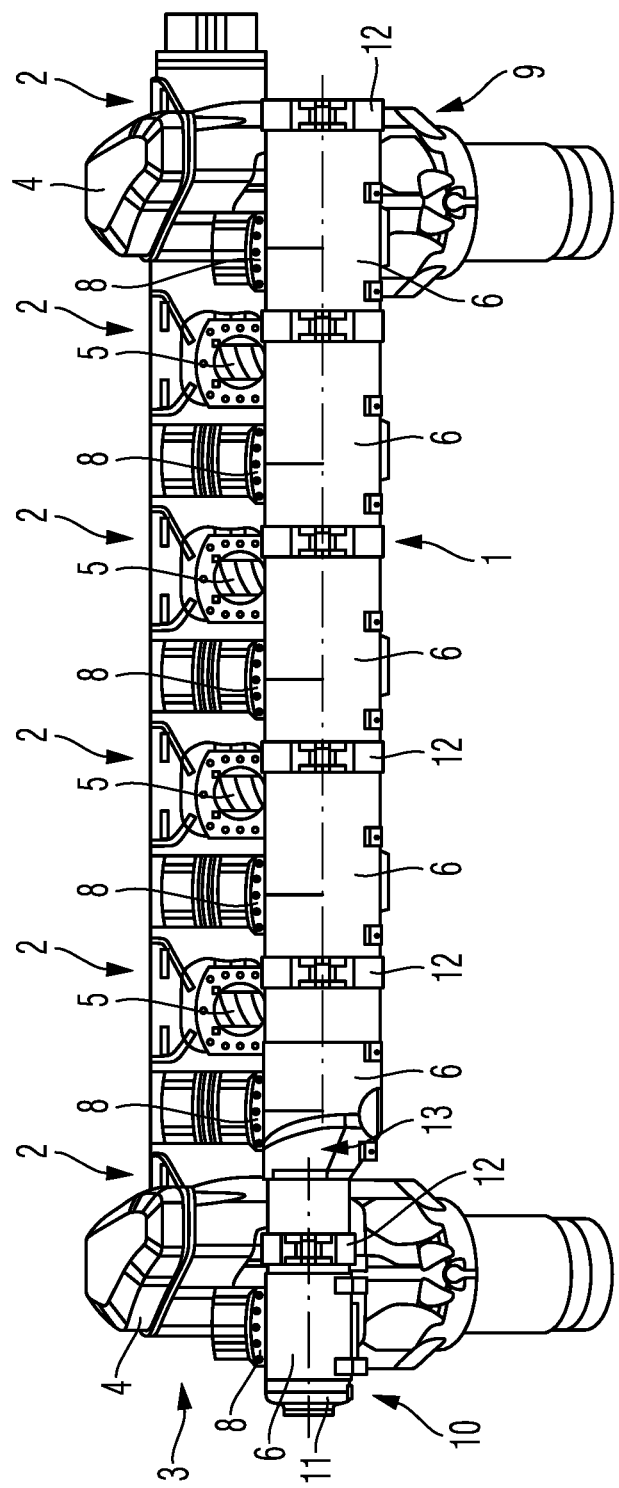
FIG. 1 is an extract from an internal combustion engine in the region of a cylinder bank and a charge air line.

FIG. 1 shows an extract from an internal combustion engine according to an aspect of the invention in the region of a charge air line 1 according to the invention, which extends along multiple cylinders 2 of a cylinder bank 3 arranged in-line.

Figure 2:
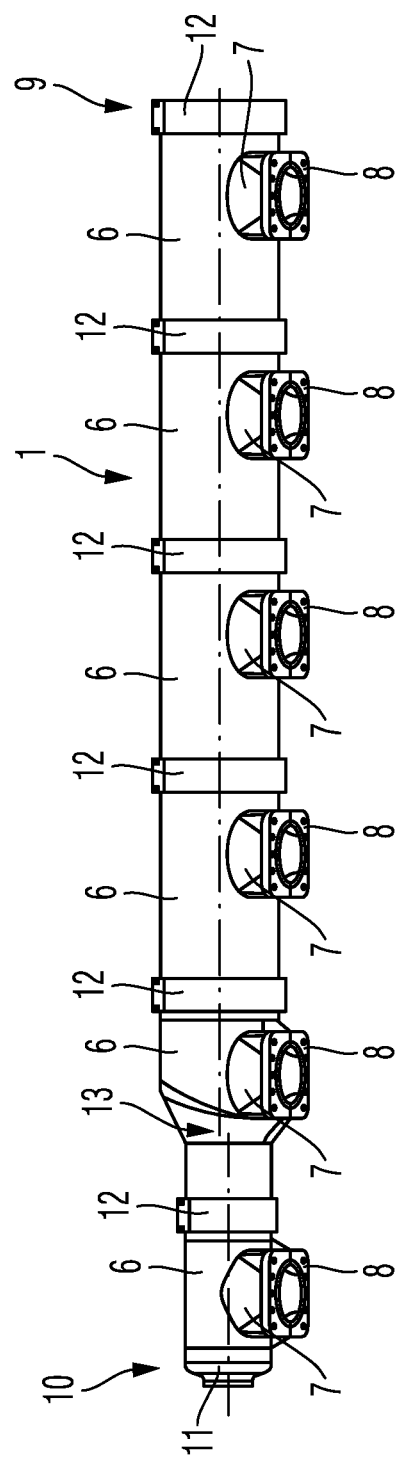
FIG. 2 is the charge air line in sole representation.

In the exemplary embodiment shown in FIG. 1, the cylinder bank 3 comprises six cylinders 2 arranged in-line. By way of the charge air line 1, all cylinders 2 of the cylinder bank 3 can be supplied with charge air. FIG. 2 shows the charge air line 1 in sole representation in a position rotated relative to FIG. 1.

In FIG. 1, two cylinder heads 4 of the two outermost cylinders 2 are shown. Of the cylinders 2 arranged in between the cylinder heads are not shown in FIG. 1, so that in FIG. 1, for these cylinders, a view of exhaust lines 5 is cleared, via which exhaust gas, incurred during the combustion of the fuel in the cylinders 2, can be discharged from the cylinders 2.

As already explained, the charge air line 1 supplies the cylinders 2 with charge air, wherein the charge air line 1 comprises multiple charge air line sections 6. From each charge air line section 6, a branch 7 leads to the respective cylinder 2 in order to supply the respective cylinder 2 with charge air line. The respective branch 7 branches perpendicularly or approximately perpendicularly off the respective charge air line section 6.

The respective branch 7 is screwable or screwed to the cylinder head 4 of the respective cylinder 2 via a flange connection, wherein in particular FIG. 2 shows the flanges 8 formed on the branches 7, via which the charge air line 1 or the branch 7 of the respective charge air line section 6 can then be screwed to the respective cylinder head 4 of the respective cylinder 2.

The charge air line 1 composed of the multiple charge air line sections 6 comprises an upstream end 9, via which the charge air line 1 can be supplied with charge air.

Emanating from the upstream end 9, charge air can thus be fed to the charge air line 1. Emanating from this upstream end 9 of the charge air line 1, the charge air flows in the direction of a downstream end 10 of the charge air line 1, wherein this downstream end 10 of the charge air line 1 is closed by an end cap 11.

The individual charge air line sections 6 are provided by corresponding segments, which are connected to one another via the connecting devices 12. By way of this it is possible to adapt the length or the number of the charge air line sections 6 to the number of the cylinders 2 of the internal combustion engine.

In the illustrated exemplary embodiment, the cylinder bank 3 comprises a number N=6 of cylinders 2. Accordingly, the air line 1 in this case comprises a number N=6 charge air line sections 6. Emanating from each charge air line section 6, a branch 7 branches off in the direction of the cylinder head 4 of the respective cylinder 2, to thus supply each cylinder 2 with charge air.

The number N=6 of the cylinders 2 and of the charge air line sections 6 is purely exemplary in nature. The number N can also be greater than six or smaller than six. Accordingly, N can be, for example, ten or seven or five.

At the upstream end 9 of the charge air line 1, the charge air line 1 has a larger flow cross section than at the downstream end 10. Because of this, a transverse force, which in the region of the last charge air line segment 6 seen in the flow direction of the charge air is generated by the closing of the charge air line 1 via the end cap 11, can be reduced. Because of this, screw connections, via which the flanges 8 of the branches 7 of the charge air line segments 6 are screwed to the cylinder heads 4 of the cylinders 2 can be dimensioned smaller and lighter.

The charge air line 1, in the region of the upstream end 9 and emanating, seen from the upstream end 9, in the region of the 1-st to J-th charge air line section 6 has a first flow cross section. J is smaller than N. The charge air line 1 emanating, seen from the upstream end 9, at least in the region of the N-th charge air line section 6 and of the upstream end 10 and thus in the region of the end cap 11 has a second flow cross section which is smaller than the first flow cross section.

In the shown exemplary embodiment, J=N-1. From this it follows that in the shown exemplary embodiment the charge air line 1 in the region of the downstream end 9 and emanating, seen from the upstream end 9, in the region of the 1-st to N-1-th charge air line section the first flow cross section and that the charge air line in the region of the N-th charge air line section and of the downstream end 10 as well as end cap 11 has the second flow cross section which is smaller than the first flow cross section. Here it is evident from FIGS. 1 and 2 that in the region of the J-th charge air line section 6, i.e., in the illustrated exemplary embodiment in the region of the N-1-th charge air line section 6, the flow cross section decreases from the first flow cross section to the second flow cross section, namely directly adjoining the branch 7, namely directly upstream of the branch 7 of the J-th charge air line section 6. The J-th charge air line section 6, namely in the illustrated exemplary embodiment the N-1-th charge air line section 6 accordingly has a part section 13, in which the flow cross section decreases from the first flow cross section to the second flow cross section, namely preferentially continuously, in particular in the manner of a funnel or conically.

In the exemplary embodiment of FIGS. 1 and 2, the transverse force is thus not exclusively incurred in the region of the, as seen in flow direction, last charge air line section 6 but rather in the region of the last and penultimate charge air line section 6.

By suitably dimensioning a ratio V=A2/A1 between the second flow cross section A2 and the first flow cross section A1, that transverse force incurred with charge air lines known from practice exclusively in the region of the last charge air line section 6, can be distributed in a defined manner to multiple charge air line sections 6 in the illustrated exemplary embodiment 2, namely over the last and penultimate charge air line section 6. In particular when V=0.5, approximately identically sized transverse forces are incurred in the region of these charge air line sections 6. It is also possible to select a different ratio for V. Accordingly, $0.3 \leq V \leq 0.7$ applies: preferably $0.4 \leq V \leq 0.5$ applies.

Although in the illustrated exemplary embodiment the change of the flow cross section, emanating from the first flow cross section to the second flow cross section, occurs in the region of the penultimate (N-1-th) charge air line section 6 it is also possible to make this change of the flow cross section on another charge air line segment 6, for example on the third or N-2-th charge air line segment 6.

In the illustrated preferred exemplary embodiment, the decrease of the diameter from the first upstream flow cross section to the second downstream flow cross section occurs in the region of a single charge air line segment 6. It is also possible to make this change of the flow cross section stepped in two or three charge air line segments 6. Accordingly, a first decrease of the flow cross section can be performed, for example, in the region of the third from last charge air line section 6 and a second reduction of the flow cross section in the region of the penultimate charge air line section 6. In this case, a reduction of the flow cross section emanating from the first flow cross section to a third flow cross section then takes place in the region of the third from last charge air line section 6 and a reduction of the flow cross section emanating from the third flow cross section to the second flow cross section in the region of the penultimate charge air line section 6, so that the transverse force is then distributed over three charge air line sections 6.

The version of FIGS. 1 and 2, in which the decrease of the flow cross section takes place in the region of a single charge air line section 6 emanating from the first flow cross section to the second flow cross section however is preferred in order to employ as many same parts as possible.

With the invention it is possible to distribute a transverse force, which with charge air lines 1 known from practice exclusively acts on the last charge air line section 6, over multiple charge air line sections 6, in particular over two charge air line sections 6, namely over the last and the penultimate charge air line section 6, emanating seen from the upstream end 9 of the charge air line 1. In particular when the second flow cross section corresponds to half of the first flow cross section, the transverse force is then equally distributed over these two charge air line sections 6. By way of this it is ultimately possible to dimension a screw connection between the flange 8 of the respective branch 7 of the respective charge air line section 6 and the respective cylinder head 4 of the respective cylinder 2 smaller and lighter since lower transverse forces have to be absorbed and thus the corresponding screw connections can be dimensioned smaller and lighter.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMBERS

1 Charge air line
2 Cylinder
3 Cylinder bank
4 Cylinder head
5 Exhaust line
6 Charge air line section
7 Branch
8 Flange
9 Upstream end
10 Downstream end
11 End cap
12 Connecting device
13 Intermediate section

We claim:

1. A charge air line (1) of an internal combustion engine for supplying a plurality of cylinders (2) of a cylinder bank (3) of the internal combustion engine arranged in-line with charge air, the charge air line (1) comprising:
a plurality of charge air line sections (6), each of the plurality of charge air line sections (6) having, emanating therefrom, a branch (7) that leads to a respective one of the plurality of cylinders (2), the branch (7) being screwable to a cylinder head (4) of the respective one cylinder (2);
an upstream end (9), via which charge air is feedable to the charge air line (1); and
a downstream end (10) of the charge air line (1), which is closed by an end cap (11),
wherein the charge air line (1) at the upstream end (9) has a larger flow cross section than at the downstream end (10), so as to provide a flow cross section decrease, and
wherein each of the plurality of air line sections (6) is a segment of the charge air line (1) connected to an adjacent air line section by a connector (12), and the decrease in flow cross section occurs in a single charge air line section.

2. The charge air line according to claim 1, wherein
the plurality of charge air line sections are N in number and are configured to supply N cylinders (2) of the cylinder bank (3) with the charge air,
the charge air line (1) in a region of the upstream end (9), and emanating, as seen from the upstream end (9), in a region of 1-st to J-th charge air line sections (6), has a first flow cross section, wherein J<N, and
the charge air line (1) emanating, as seen from the upstream end (9) at least in the region of the N-th charge air line section (6) and in a region of the downstream end (10) has a second flow cross section that is smaller than the first flow cross section.

3. The charge air line according to claim 2, wherein the flow cross section of the charge air line (1) decreases, in the region of the J-th charge air line section (6), from the first flow cross section to the second flow cross section.

4. The charge air line according to claim 2, wherein J=N−2.

5. The charge air line according to claim 1, wherein
the plurality of charge air line sections are N in number and are configured to supply N cylinders (2) of the cylinder bank (3) with the charge air,
the charge air line (1) in a region of the upstream end (9), and emanating, as seen from the upstream end (9), in a region of 1-st to N−1th charge air line sections (6), has a first flow cross section, and
the charge air line (1) emanating, as seen from the upstream end (9) at least in the region of the N-th charge air line section (6) and in a region of the downstream end (10) has a second flow cross section that is smaller than the first flow cross section.

6. The charge air line according to claim 5, wherein the flow cross section in the region of the N−1-th charge air line section (6) decreases from the first flow cross section to the second flow cross section.

7. The charge air line according to claim 6, wherein the flow cross section continuously decreases from the first flow cross section to the second flow cross section.

8. The charge air line according to claim 7, wherein the flow cross section decreases funnel-like or conically from the first flow cross section to the second flow cross section.

9. The charge air line according to claim 8, wherein for the ratio V=A2/A1 between the second flow cross section A2 and the first flow cross section A1 $0.3 \leq V \leq 0.7$ applies, or $0.4 \leq V \leq 0.5$ applies, or V=0.5 applies.

10. An internal combustion engine comprises:
at least one cylinder bank (3), wherein each cylinder bank (3) comprises multiple cylinders (2) arranged in-line,
at least one charge air line (1) configured to supply the cylinders (2) of the respective cylinder bank (3) with charge air,
wherein the respective charge air line (1) is configured according to claim 1.

* * * * *